CAPSTAN FOR MAGNETIC RECORDERS

Filed April 29, 1954

INVENTOR.
James R. Hall
BY Morris A. Rabkin
ATTORNEY

United States Patent Office 2,819,349

Patented Jan. 7, 1958

2,819,349

CAPSTAN FOR MAGNETIC RECORDERS

James R. Hall, Haddonfield, N. J., assignor to Radio Corporation of America, a corporation of Delaware Application April 29, 1954, Serial No. 426,463

The terminal fifteen years of the term of the patent to be granted has been disclaimed 5 Claims. (Cl. 179—100.2)

The present invention relates to magnetic recording and, more particularly, to improved capstans for use with a multi-track magnetic record carrier.

It is not uncommon to find need for a multi-track magnetic record. On such records, information is recorded through several channels simultaneously on a plurality of parallel tracks. Where the information to be recorded in each of the several tracks is different from the information recorded in the adjacent tracks, there frequently arises the need for some means to prevent or reduce the tendency of the information in one track from influencing the transducer associated with adjacent tracks. Heretofore, emphasis has been placed on physically shielding one transducer from the other. However, it is believed that leakage flux from one to the other is such that further means are required for restricting the signals magnetically recorded on the tape to the one desired channel in which it is recorded.

It is, therefore, an object of the present invention to provide improved means for eliminating cross-talk between the separate channels of a multi-track magnetic record.

It is another object of the present invention to provide a cross-talk reducing guide roller or capstan for use with multi-track magnetic records.

In accomplishing these and other objects, there has been provided, in accordance with the present invention, a magnetic recording system having a capstan for use with a multi-channel magnetic record. The capstan comprises a plurality of disc laminations, the laminations being alternately of magnetic and non-magnetic material.

A better understanding of this invention may be had from the following detailed description when read in connection with the accompanying drawing in which.

Figures 1, 2, 3:
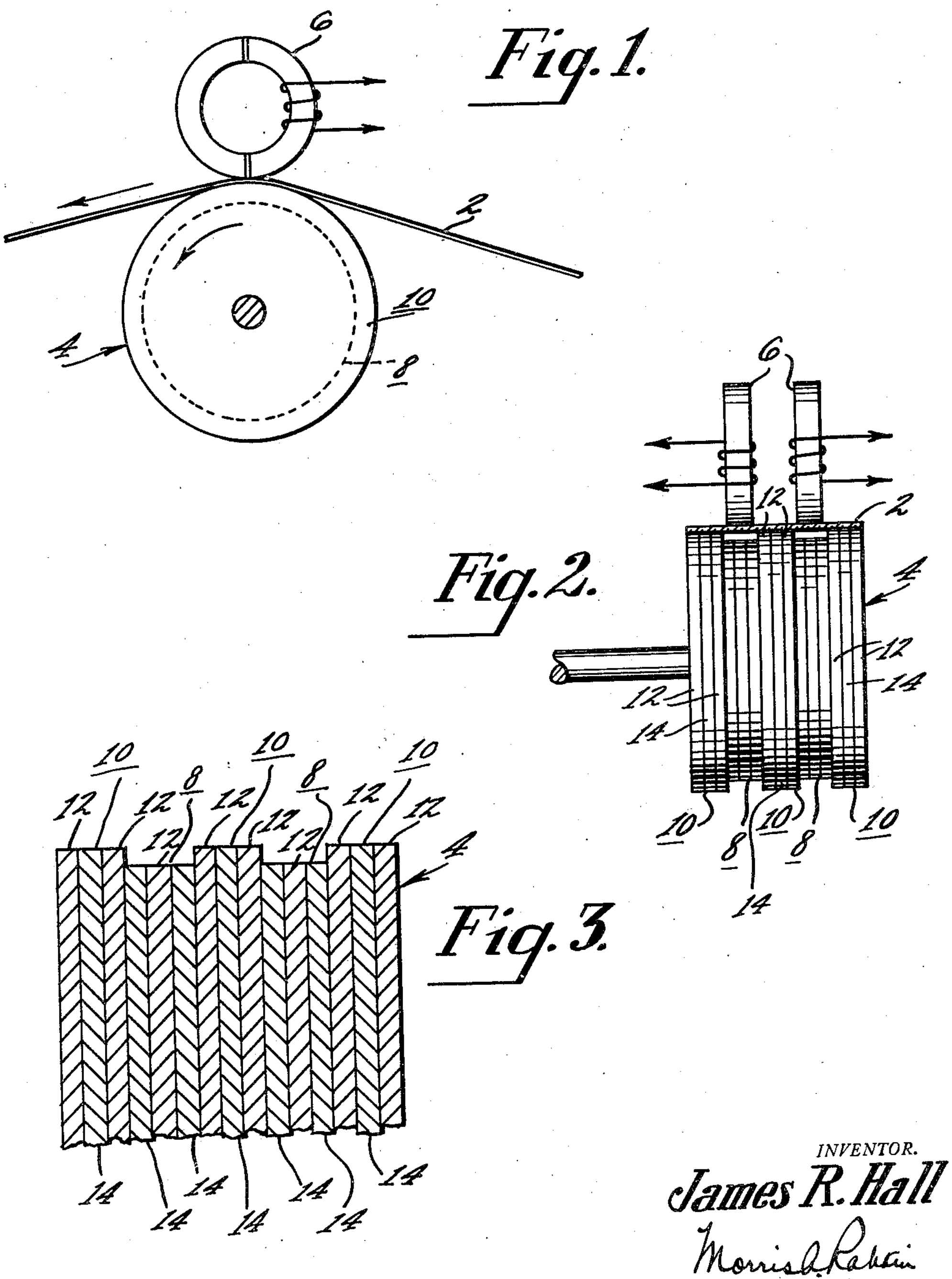
Figure 1 is an elevational view of a schematic representation of a portion of a magnetic recording system embodying the present invention.
Figure 2 is a side view of the apparatus shown in Figure 1.
Figure 3 is an enlarged sectional view of a portion of a capstan constructed in accordance with the present invention.

Referring now to the drawing in more detail, in Figures 1 and 2 there is shown a portion of a magnetic recording system wherein a tape record receiving member 2 is driven by a capstan 4 past an array of magnetic record transducers 6. For purposes of illustration, two such transducers are shown in Figure 2. It will, of course, be appreciated that the number of separate transducers may be varied without departing from the spirit and scope of the present invention. It will be understood that the member 4 may be a guide roller or idler and that the tape may be propelled by any suitable and well known means. The magnetic record receiving member 2 is arranged to receive, in the illustrated embodiment, two parallel simultaneous record tracks.

In certain applications, it is extremely important that the magnetic record be advanced past the transducers 6 with as smooth and constant a motion as can be achieved. If the capstan 4 is driven at a constant angular velocity and the constancy of that velocity is controlled by known means (not shown), the point of maximum stability of the advancement of the tape is at a point where the tape is engaged by the capstan.

For good magnetic coupling between the tape and the transducer, there should be at least a small amount of resilience either in the magnetic record receiving member or in the transducer mounting means. For extremely accurate work, it is preferable that the transducers themselves be rigidly mounted so that they may be accurately aligned and adjusted. Therefore, the resilience of the coupling must appear in the tape. To accomplish such resilience, the drum constituting the capstan 4 is of a smaller diameter in the areas 8 corresponding to the record tracks than it is in the areas 10 constituting the spacing between adjacent record tracks. In this manner, the tape record receiving member is supported in the non-recorded areas and is unsupported in the record track areas. The stiffness of the tape as it passes over the curved surface of the drum provides sufficient pressure to effect adequate coupling between the record member and the transducers. However, since the tape is relatively flexible, the flexibility permits a measure of the aforementioned resilience to be introduced. The several transducers may be separately shielded in any suitable and known manner. Since the inter transducer shielding is not a part of the present invention, such shielding is not illustrated.

Again for purposes of clarity of illustration, the relative depth of the peripheral grooves 8 resulting from the differences in diameter of the several portions of the drum constituting the capstan has been exaggerated. In actual practice, a drum in which the grooves were 0.015 of an inch deep have been found to be satisfactory.

Since it is difficult if not impossible to shield the tape contacting portions of the transducers, other means must be provided to reduce the leakage flux passing from one transducer to another along a path adjacent these portions. The capstan drum 4 is formed from a plurality of disc laminations 12 and 14. This is shown most clearly in the enlarged cross-sectional fragmentary view of Figure 3. Each of the laminations are of a thickness which is small relative to the width of the record tracks on the record receiving member or of the spaces between the tracks. The laminations are made of two different types of material. One group of these laminations 12 is made from a high permeability, magnetic material such, for example, as mumetal. The other group of laminations 14 is made of a non-magnetic conductive material such, for example, as brass. In assembling the drum, the laminations are alternately selected from the magnetic group and the non-magnetic group.

In the illustrated embodiment of the invention, the laminations are shown as being of a thickness approximately one-third the width of either the record track or of the spaces between the record tracks on the magnetic record receiving member. With this arrangement, the drum is made up of sets of three laminations. The laminations corresponding in position to the spaces are slightly larger in diameter than the laminations which correspond in position to the record track areas of the record receiving member. With the arrangement shown, there are two magnetic disc laminations and one non-magnetic disc for each portion corresponding to the space areas of the record receiving member. The non-magnetic disc is, of course, sandwiched between the two magnetic discs. Similarly, the portions corresponding to the record track area are formed of two non-magnetic discs and one magnetic disc sandwiched between them.

In operation, the stray flux from the record tracks or the tips of the transducers is directed to and dissipated by the magnetic laminations, and any tendency for the flux thus directed to magnetically influence the next adjacent magnetic disc would be neutralized by the development of eddy currents in the non-magnetic disc members. In this manner, unwanted influence from one record channel to another may be substantially eliminated.

What is claimed is:

1. A cross-talk reducing capstan for use with magnetic records having a plurality of laterally spaced parallel record tracks of predetermined width, said capstan comprising a drum formed of a plurality of disc laminations, each of said laminations being of a thickness which is small compared to the width of the record tracks, and said laminations being alternately of magnetic and non-magnetic materials.

2. A cross-talk reducing capstan for use with magnetic records having a plurality of laterally spaced, parallel record tracks of predetermined width and spacing, said capstan comprising a drum formed of a plurality of disc laminations, each of said laminations being of a thickness substantially one-third of the width of one of the record tracks, said laminations being alternately of magnetic and non-magnetic materials.

3. A cross-talk reducing capstan for use with magnetic record receiving members having a plurality of laterally spaced, parallel record tracks of predetermined width and spacing, said capstan comprising a drum formed of a plurality of disc laminations, each of said laminations being of a thickness substantially one-third of the width of one of the record tracks and of the width of the spacing between adjacent tracks, said laminations being alternately of magnetic and non-magnetic materials, the disc laminations of said drum corresponding in position to the record tracks being of smaller diameter than the disc laminations corresponding in position to the space areas of the record receiving member to form peripheral grooves around said capstan corresponding in position to the record track areas of said record receiving member.

4. A cross-talk reducing capstan for use with magnetic record receiving members having a plurality of laterally spaced, parallel record tracks of predetermined width and spacing, said capstan comprising a drum formed of a plurality of disc laminations, each of said laminations being of a thickness substantially one-third of the width of one of the record tracks and of the width of the spacing between adjacent tracks, said laminations being alternately of magnetic and non-magnetic material, the disc laminations of said drum corresponding in position to the record track including a magnetic disc sandwiched between two non-magnetic discs and the disc laminations corresponding in position to the space areas of the record receiving member including a non-magnetic disc sandwiched between two magnetic discs.

5. The invention as set forth in claim 4 wherein said discs corresponding in position to the record tracks on the record receiving member are of a diameter slightly less than the diameter of the discs corresponding in position to the space areas on said record receiving member.

References Cited in the file of this patent

UNITED STATES PATENTS

| | | |
|---|---|---|
| 994,871 | Payne | June 13, 1911 |
| 2,726,287 | Sharp | Dec. 6, 1955 |

FOREIGN PATENTS

| | | |
|---|---|---|
| 69,273 | Norway | May 28, 1945 |